United States Patent
Brumley et al.

(10) Patent No.: US 8,156,358 B2
(45) Date of Patent: Apr. 10, 2012

(54) SYSTEM AND METHOD FOR DYNAMIC MODULAR INFORMATION HANDLING SYSTEM POWER DISTRIBUTION

(75) Inventors: Alan Brumley, Cedar Park, TX (US); Jaydev Reddy, Austin, TX (US); Ashish Munjal, Round Rock, TX (US); Arun Munhalyan, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 569 days.

(21) Appl. No.: 12/388,606

(22) Filed: Feb. 19, 2009

(65) Prior Publication Data

US 2010/0211804 A1    Aug. 19, 2010

(51) Int. Cl.
*G06F 1/26* (2006.01)
(52) U.S. Cl. ........ 713/320; 713/340; 713/300; 361/676; 361/695
(58) Field of Classification Search .......... 713/300–344; 361/376, 679
See application file for complete search history.

(56) References Cited

U.S. PATENT DOCUMENTS

| | | | |
|---|---|---|---|
| 7,444,554 B2 * | 10/2008 | Hori et al. | 714/48 |
| 7,555,666 B2 | 6/2009 | Brundridge et al. | |
| 7,593,225 B2 * | 9/2009 | Sasagawa et al. | 361/695 |
| 2006/0248358 A1 | 11/2006 | Fung | |

OTHER PUBLICATIONS

M. Rangarajan et al., U.S. Appl. No. 11/989,920, filed Aug. 3, 2006, entitled System and Method of Managing Heat in Multiple Central Processing Units.
S. Dube et al., U.S. Appl. No. 12/115,271, filed May 5, 2008, entitled System and Method for Automatic Throttling of Resources in an Information Handling System Chassis.
M. Roberts et al., U.S. Appl. No. 12/135,323, filed Jun. 9, 2008, entitled System and Method for Managing Power Supply Units.

* cited by examiner

*Primary Examiner* — Brian Misiura
*Assistant Examiner* — Kim Huynh
(74) *Attorney, Agent, or Firm* — Hamilton & Terrile, LLP; Robert W. Holland

(57) ABSTRACT

Infrastructure power resources of a chassis information handling system are made available to run chassis information handling system modules when infrastructure devices are not using the power resources. For example, cooling fans that cool information handling system modules supported by an information handling system chassis run at variable speeds having variable power consumption. A power reserve maintained to run the cooling fans at full speed if needed is made available to information handling system modules when under power management by a chassis manager.

20 Claims, 3 Drawing Sheets

SYSTEM AND METHOD FOR DYNAMIC MODULAR INFORMATION HANDLING SYSTEM POWER DISTRIBUTION

BACKGROUND OF THE INVENTION

1. Field of the Invention

The present invention relates in general to the field of information handling system power subsystems, and more particularly to a system and method for dynamic modular information handling system power distribution.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In order to operate properly, information handling systems typically need a reliable power source to power electronic components and cooling to remove excess heat produced as a byproduct of power applied to the electronic components. In most operating conditions, if an information handling system continues to run without adequate cooling, the electronic components will overheat and destroy themselves. To prevent overheating, information handling systems typically include internal temperature gauges to measure operating temperatures and a feedback to the cooling system so that cooling fans operate with enough speed to remove excess heat. Under conditions of high thermal stress, the electronic components are sometimes "throttled" to run at reduced clock speeds so that the amount of heat produced by the electronic components is reduced. One trend that has developed in the server information handling system field is the support of multiple information handling systems in a common chassis having common power and cooling subsystems. A chassis management controller (CMC) distributes power and cooling resources between the multiple information handling systems supported by the chassis. Baseboard management controllers (BMC) running on each information handling system cooperate with the chassis management controller to enforce power and cooling constraints that ensure proper operation of the chassis as a whole.

One of the difficulties with chassis-supported modular information handling systems is that a wide range of power and cooling demands may exist during the course of normal operations. For example, the power consumed by a central processing unit (CPU) varies substantially depending on the workload of the CPU. A CMC power manager has to ensure that adequate power is available to run each information handling system supported by the chassis over the range of operations allowed for each information handling system. If, for instance, the total power that the information handling systems can demand exceeds the power available from the power supply, the CMC power manager typically restricts the operation of one or more information handling system modules to ensure that total power demand will not exceed available power. To enforce power consumption limitations, the CMC power manager provides a maximum power consumption allotment to each BMC so that the BMC can prevent its information handling system from drawing greater than the allotted power. In addition to allotting power to the information handling system modules, the CMC power manager also must ensure that adequate power is available to run cooling fans that cool the modules. Typically, enough power is reserved so that the cooling fans can operate at full speed. One safety measure calls for the fans to automatically operate at full speed in the event that the CMC fails. In such a situation, adequate power should remain available to operate the information handling system modules at the maximum power allotment stored in each BMC, however, the power allotment to the fans reduces the amount of power available to the information handling system modules during normal operations.

SUMMARY OF THE INVENTION

Therefore a need has arisen for a system and method which dynamically allocates chassis infrastructure power for use by information handling system modules.

In accordance with the present invention, a system and method are provided which substantially reduce the disadvantages and problems associated with previous methods and systems for power distribution at a chassis that supports plural information handling system modules. A chassis power manager allows allocation of power reserved for infrastructure to information handling system modules supported by the chassis when the reserve power is not used by the infrastructure. The reserve power is dynamically allocated so that increased infrastructure need for power is met by removing reserve power from modules and decreased infrastructure need for power releases reserve power for used by the modules.

More specifically, an information handling system chassis has infrastructure to support plural information handling system modules, such as a blade chassis and blade modules. A chassis manager, such as a CMC, allocates power provided by a chassis power supply system to run the information handling system modules and chassis infrastructure, such as cooling fans. A chassis power manager monitors power consumption by the cooling fans and reports the current power consumption as maximum power consumed by the cooling fans so that power otherwise reserved by the chassis manager to run the cooling fans at maximum speed is instead made available for use by information handling system modules. The chassis power manager monitors cooling fan power consumption and reports changes in power consumption to the chassis manager as updated maximum power of the cooling fans. If the chassis manager fails, the information handling system modules fail to a throttled state that reduces power consumption and the cooling fans transition to full speed. To ensure that excessive power draw does not occur with a chassis manager failure, the chassis power manager does not allow information handling system module power up unless the total power of all modules in a throttled state plus the power with the fans at full speed are less than the maximum power available from the chassis power supply system.

The present invention provides a number of important technical advantages. One example of an important technical advantage is that chassis infrastructure power is dynamically allocated to information handling system modules. Allocation of power away from infrastructure components, such as cooling fans, when the power is not needed for the infrastructure components allows greater use of power by information handling system modules. Power management after CMC failure that throttles the information handling system modules and sets cooling fans to the full speed ensures that power allocated away from chassis infrastructure will be available for a chassis infrastructure worst case scenario with operating conditions at the chassis remaining within predetermined environmental constraints.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Allocation of information handling system chassis infrastructure power, such as power reserved for cooling fan operation, to information handling system modules helps to maintain operation of the modules with increased processing capability for a given power supply. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
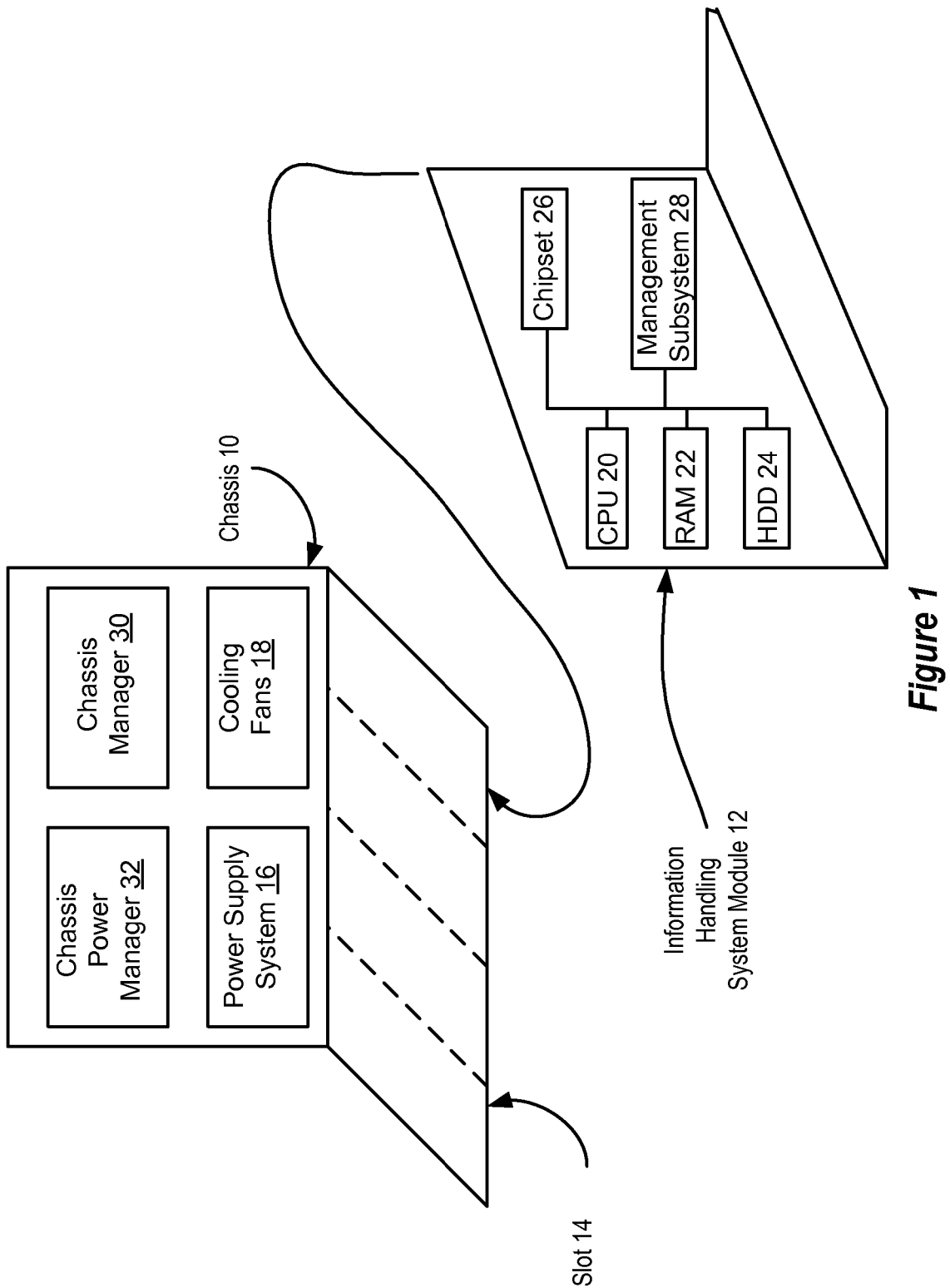
FIG. 1 depicts a block diagram of an information handling system chassis that supports plural information handling system modules having dynamic distribution of infrastructure power for use by the information handling system modules.

Referring now to FIG. 1, a block diagram depicts an information handling system chassis 10 that supports plural information handling system modules 12 having dynamic distribution of infrastructure power for use by information handling system modules 12. Chassis 10 is, for example, a blade chassis that provides power and cooling infrastructure to blade modules. Each of plural information handling system modules 12 fit into a slot 14 of chassis 10 to allow access to power provided from a power supply system 16 and cooling airflow from cooling fans 18. Each information handling system module 12 is built from a plurality of processing components that cooperate to process information, such as a CPU 20, RAM 22, a hard disk drive 24, a chipset 26 and a management subsystem 28. Management subsystem 28 manages operations at a module 12, such as remote power up and power down, by communication with a chassis manager 30, which manages allocation of chassis resources to the modules 12. For example, management subsystem 28 is a baseboard management controller (BMC) and chassis manager 30 is a chassis management controller (CMC) 32. Management subsystem 28 and chassis manager 30 execute instructions on a processor or microcontroller, such as firmware stored in flash memory, using a computer readable medium, such as memory.

In operation, chassis manager 30 determines a total power available from power supply system 16 and allocates the power to information handling system modules 12 and cooling fans 18. Chassis manager gives the highest priority for power to cooling fans 18 so that adequate cooling is available to avoid damage to modules 12 disposed in chassis 10. Information handling system modules 12 are allocated power with communication by chassis manager 30 to management subsystems 28 of a maximum allotted power so that management subsystems 28 ensure that their associated module does not consume greater than the allotted power. A chassis power manager 32 monitors power consumption by infrastructure devices of chassis 10, such as cooling fans 18, to ensure that adequate power is available to run infrastructure devices while allowing excess power dedicated to chassis infrastructure for use by information handling system modules 12. In the example embodiment of FIG. 1, chassis power manager 32 receives the maximum power consumption and current power consumption of cooling fans 18. Chassis power manager 32 reports the current power consumption of cooling fans 18 to chassis manager 30, which withholds the current cooling fan power consumption from use by information handling system modules 12 so that the maximum capacity of power supply system 16 is not exceeded.

By reporting current cooling fan power consumption as maximum cooling fan power consumption, chassis power manager 32 spoofs chassis manager 30 into using power ordinarily held as reserve power to instead support operation of modules 12. Chassis power manager 32 monitors power consumption by cooling fans 18 so that, if cooling fan power consumption increases the increased power consumption is reported to chassis manager 30 as maximum cooling fan power consumption. If cooling fan power consumption decreases, the decreased power consumption is reported to chassis manager 30 as maximum cooling fan power consumption. Thus, cooling fan reserve power needed to run cooling fans 18 at full speed is dynamically allocated to information handling system modules 12. Chassis power manager 32 is, for example, firmware instructions stored on a computer readable medium and executed on a processor, such as a microcontroller within power supply system 16, cooling fans 18 or chassis manager 30. Note that the current power consumption reported by chassis power manager 32 to chassis manager 30 might include a slight increase over actual power consumption to maintain a margin of error that avoids inadvertent excess power demands.

In order to protect information handling system chassis 10 from an overheat situation, information handling system modules 12 and cooling fans 18 monitor communications by chassis manager 30 and revert to a safe level of operations if a failure of chassis manager 30 is detected. For example, a complex programmable logic device (CPLD) on each information handling system module 12 monitors a serial link with a field programmable gate array (FPGA) of chassis manager 30 to detect voids on the serial interface that indicate a failure or removal of chassis manager 30. If a failure of chassis manager 30 is detected, each information handling system module 12 transitions to a throttled state to reduce power consumption and each cooling fan 18 transitions to a maximum speed to ensure adequate cooling. Chassis power manager 32 monitors activities on chassis 10 to ensure that the safe level of operation will not place an excessive power demand on power supply system 16. For example, each time an information handling system module 12 requests to power on, chassis power manager 32 denies approval for power on if the power consumed by the module 12 in a throttled state plus the power consumed by currently running modules 12 in throttled states and power consumed by cooling fans 18 running at full speed exceeds total power available from power system supply 16. Essentially, modules 12 and cooling fans 18 double book power reserved for operation of cooling fans 18 while under management by chassis manager 30 and revert to consumption of the reserve power by the cooling fans when not under management of chassis manager 30.

Figure 2:
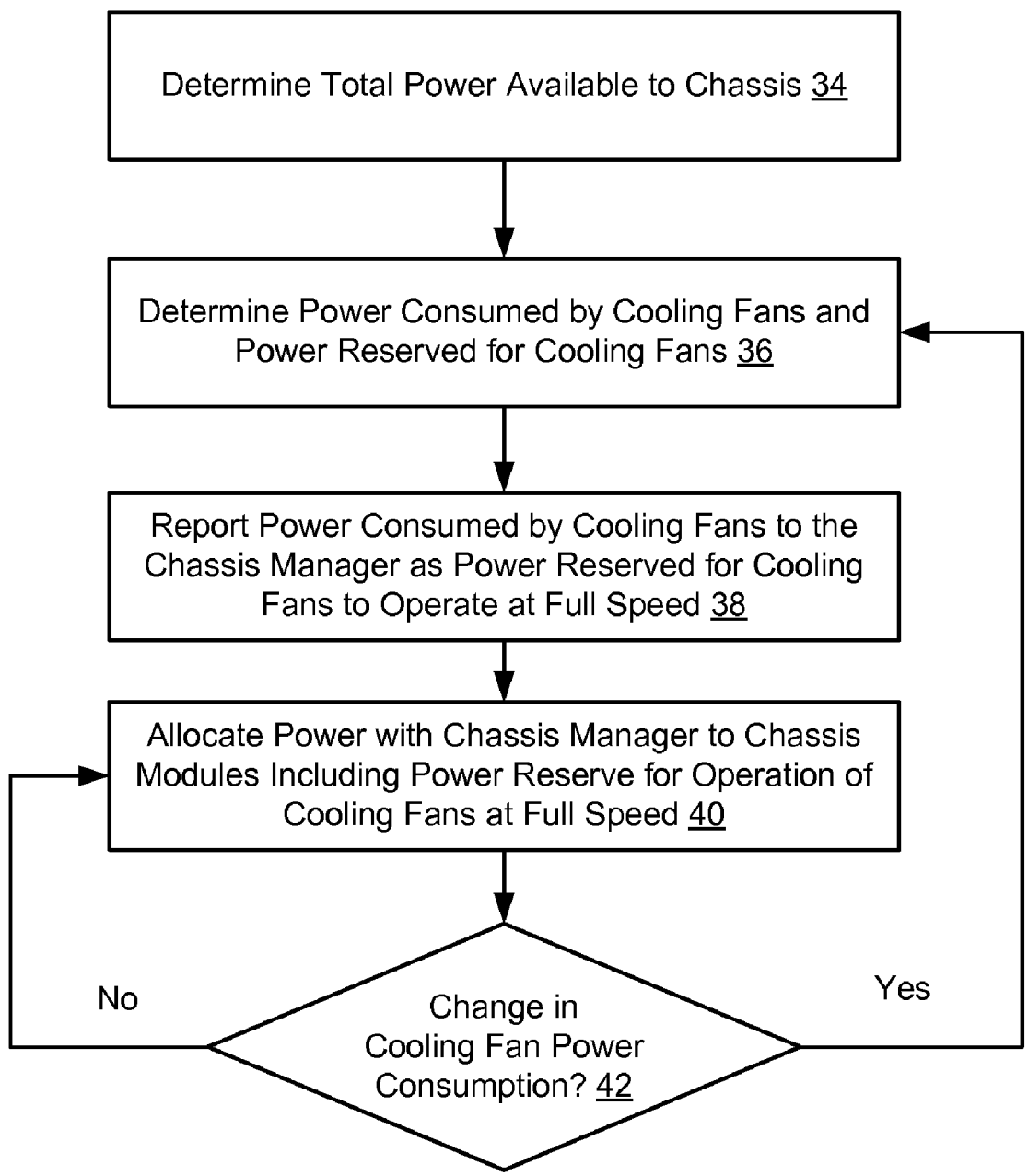
FIG. 2 depicts a flow diagram of a process for dynamic distribution of chassis infrastructure power for use by information handling system modules supported by the chassis.

Referring now to FIG. 2, a flow diagram depicts a process for dynamic distribution of chassis infrastructure power for use by information handling system modules supported by the chassis. The process begins at step 34 with a determination of the total power available from the power supply system. At step 36 a determination is made of the power currently consumed by the cooling fans and the power reserve for the cooling fans. The cooling fan power reserve is the difference between the maximum power consumption of the cooling fans and the current consumption of the cooling fans. At step 38, the power consumed by the cooling fans is reported to the chassis manager as the maximum power consumption of the cooling fans, effectively providing the cooling fan power reserve for allocation by the chassis manager to the information handling system modules. At step 40, the chassis manager allocates power to the information handling system modules including the power reserved for running the cooling fans at maximum speed. If the chassis manager fails, the cooling fans revert to full speed operation which uses the power reserve and the information handling system revert to a throttled state which leaves the power reserve available for cooling fan operation. At step 42, a determination is made of whether a change has occurred in fan power consumption. If not, the process returns to step 40 for allocation of the reserve power by the chassis manager to the information handling system modules. If cooling fan power consumption changes at step 42, the process returns to step 36 to dynamically allocate the changed power reserve to the information handling system modules.

Figure 3:
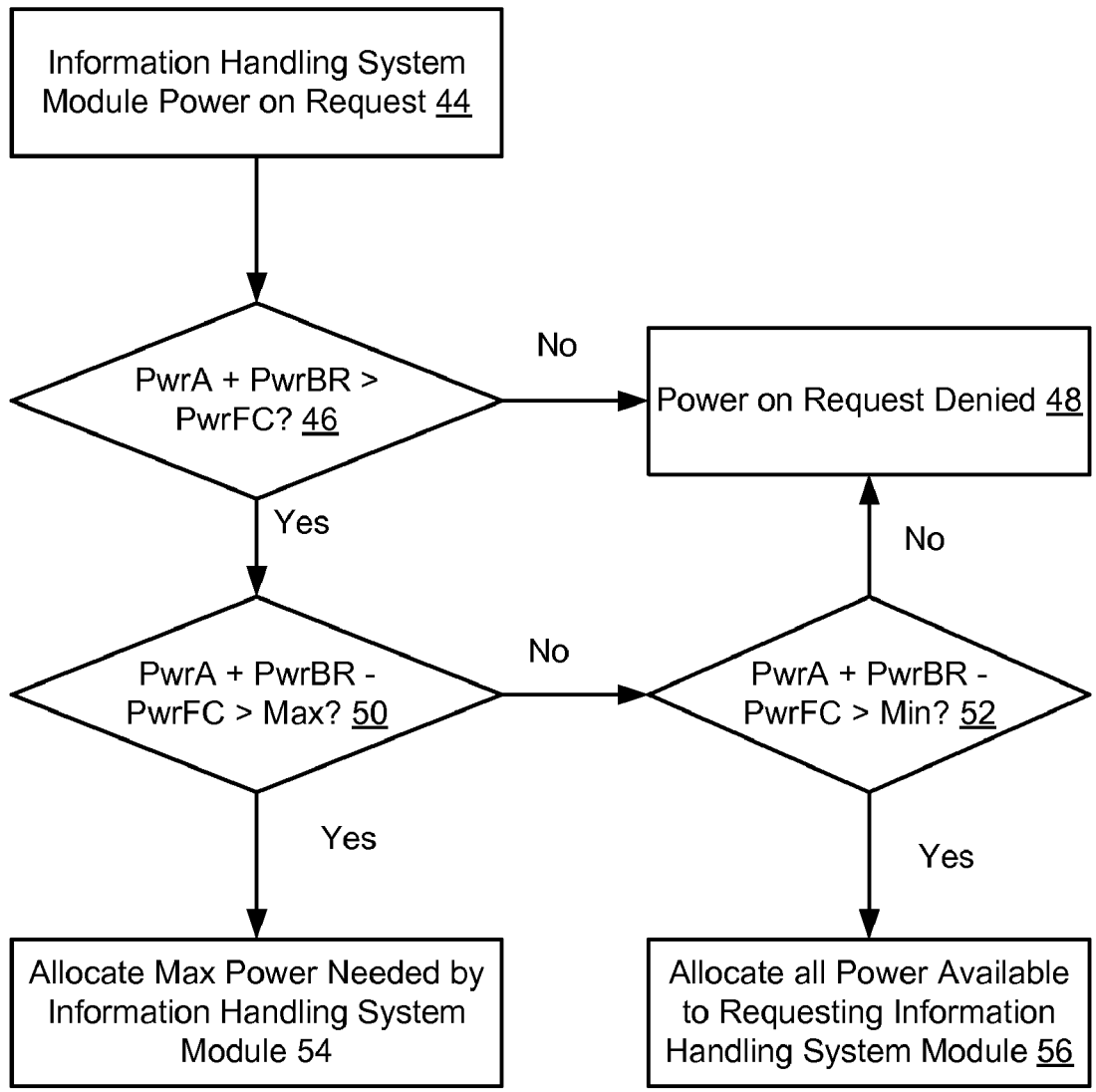
FIG. 3 depicts a flow diagram of a process for authorizing power up of information handling system modules at an information handling system chassis supporting plural modules with dynamic infrastructure power allocation.

Referring now to FIG. 3, a flow diagram depicts a process for authorizing power up of information handling system modules at an information handling system chassis supporting plural modules with dynamic infrastructure power allocation. The process begins at step 44 with receipt of an information handling system module power on request. At step 46 a determination is made of whether the total power available from the power supply system ((PwrA) i.e., power not currently claimed) plus the power reclaimable from information handling system blade modules ((PwrBR) i.e., power made available by a transition to a throttled state by running modules) is greater than the power claimed by the cooling fans transition to full speed (PwrFC). If the available power plus reclaimable power is not greater than the power claimed by cooling fan transition to full speed, the process continues to step 48 to deny the power up request. If the available power plus reclaimable is greater than the power claimed by cooling fan transition to full speed, the process continues to step 50. At step 50 a determination is made of whether the available power plus the reclaimable power minus the power claimed by running the cooling fans at full speed is greater than the maximum power used by the requesting module. If so, then adequate power exist to allocate max power needed by the requesting module and the process continues to step 54 to allocated max power needed by the requesting module. If the determination at step 50 is no, then the process continues to step 52 to determine whether the available power plus the reclaimable power minus the power needed to run the cooling fans at full speed is greater than the minimum power needed to run the requesting module. If the determination at step 52 is no, then insufficient power is available to start the requesting module and the process continues to step 48 to deny the power up request. If the determination at step 52 is yes, then enough power is available to run the requesting module at the minimum power consumption but not enough power is available to run the requesting module at the maximum power that can be used by the requesting module. The process then continues to step 56 at which the available power is allocated to the requesting module, which runs at a reduced power state.

Although the present invention has been described in detail, it should be understood that various changes, substitutions and alterations can be made hereto without departing from the spirit and scope of the invention as defined by the appended claims.

What is claimed is:

1. An information handling system comprising:
   a chassis operable to accept plural information handling system modules;
   plural information handling system modules disposed in the chassis, each information handling system module operable to process information and having a management subsystem that manages power resources used by the information handling system module;
   one or more cooling fans associated with the chassis and operable to provide cooling air flow to the information handling system modules;
   a power system associated with the chassis and operable to provide power to the information handling system and cooling fans;
   a chassis manager interfaced with the power system and the information handling system module management subsystems, the chassis manager operable to allocate power available from the power system to the information handling system modules and the cooling fans; and
   a chassis power manager interfaced with the chassis manager and operable to establish a reserve power having adequate power resources to run the one or more cooling fans at full speed and to dynamically allocate the reserve power for use by the information handling system modules when the one or more cooling fans run at less than full speed.

2. The information handling system of claim 1 wherein the chassis power manager dynamically allocates the reserve power by determining actual cooling fan power consumption and reporting actual cooling fan power consumption to the chassis manager as the maximum power consumption of the one or more cooling fans.

3. The information handling system of claim 1 wherein the information handling system management subsystems are further operable to automatically throttle their associated information handling system upon a determination of a chassis manager failure.

4. The information handling system of claim 3 wherein the one or more cooling fans are further operable to automatically run at full speed upon a determination of a chassis manager failure.

5. The information handling system of claim 4 wherein the chassis power manager is further operable to prevent information handling system modules from powering on if the power consumption of the information handling system modules in throttled states plus the cooling fans at full speed exceeds a capacity of the power subsystem to provide power.

6. The information handling system of claim 4 wherein a determination of a chassis manager failure is performed at each module information handling system by detection of voids on a serial interface between the management subsystem and the chassis manager.

7. The information handling system of claim 1 wherein the information handling system modules comprise blade modules.

8. The information handling system of claim 1 wherein the chassis manager allocates power to the one or more cooling fans with a higher priority than it allocates power to the information handling system modules.

9. A method for allocating power at an information handling system chassis, the method comprising:
running one or more cooling fans associated with the chassis at up to full speed in response to thermal conditions of the chassis;
determining a reserve power that represents the amount of power to support an increase of cooling fan speed from a current speed to full speed; and
dynamically allocating the reserve power for use by information handling system modules supported by the information handling system chassis.

10. The method of claim 9 further comprising:
changing the speed of one or more cooling fans in response to the thermal conditions;
determining the reserve power at the changed cooling fan speed; and
dynamically allocating the determined reserve power.

11. The method of claim 10 wherein changing the speed further comprises increasing the speed and determining the reserve power comprises decreasing the reserve power.

12. The method of claim 10 wherein changing the speed further comprises decreasing the speed and determining the reserve power comprises increasing the reserve power.

13. The method of claim 9 wherein dynamically allocating the reserve power further comprises:
determining current power consumption by the one or more cooling fans;
reporting the current power consumption to a chassis manager as the maximum power consumption of the one or more cooling fans; and
allocating with the chassis manager to the information handling system modules a total power available from a power supply minus the reported maximum power consumption.

14. The method of claim 9 further comprising:
detecting a failure of a chassis manager associated with the information handling system chassis; and
reverting the information handling system modules and the one or more cooling fans to a known safe level of operation.

15. The method of claim 14 wherein reverting further comprises:
running the cooling fans at full speed; and
running the information handling systems at a predetermined throttled state.

16. The method of claim 15 further comprising:
receiving a request for a power up by an information handling system module;
allowing power up of the information handling system module if power consumed by the information handling system module in a throttled state plus power consumed by running information handling modules in a running state and power consumed by the cooling fans at full speed is less than power available at the information handling system chassis.

17. A system for allocating power to plural information handling system modules supported by an information handling system chassis, the system comprising:
a power system operable to supply a total power at the chassis;
a chassis manager operable to allocate the total power between information handling system modules supported by the information handling system chassis and plural cooling fans; and
a chassis power manager interfaced with the chassis manager and the cooling fans, the chassis power manager operable to establish a reserve power having adequate power resources to run the cooling fans at full speed and to dynamically allocate the reserve power for use by the information handling system modules when the cooling fans run at less than full speed.

18. The system of claim 17 wherein the chassis power manager establishes a reserve power by reporting current power used by the cooling fans as the maximum power that the cooling fans will consume.

19. The system of claim 18 wherein the chassis power manager is further operable to detect a request for an information handling system module to power up and to deny the request if the power consumed by the requesting information handling system module in an throttled state, currently running information handling system modules in an throttled state and the cooling fans running at full speed exceeds the total power.

20. The system of claim 19 wherein the system comprises logic associated with the information handling system modules and the cooling fans operable to detect failure of the chassis manager and in response to detection of failure of the chassis manager to throttle the information handling system modules and to run the cooling fans at full speed.

* * * * *